No. 894,693. PATENTED JULY 28, 1908.
E. R. PARKHURST.
NUT LOCK.
APPLICATION FILED MAY 29, 1907.

Witnesses
Geo. Hickman Jr.
C. Bradway.

Inventor
Elijah R. Parkhurst
By Victor J. Evans
Attorney

UNITED STATES PATENT OFFICE.

ELIJAH R. PARKHURST, OF CHICAGO, ILLINOIS, ASSIGNOR OF ONE-THIRD TO JOHN W. MARSHALL, OF CHICAGO, ILLINOIS.

NUT-LOCK.

No. 894,693.  Specification of Letters Patent.  Patented July 28, 1908.

Application filed May 29, 1907. Serial No. 376,290.

*To all whom it may concern:*

Be it known that I, ELIJAH R. PARKHURST, a citizen of the United States, residing at Chicago, in the county of Cook and State of Illinois, have invented new and useful Improvements in Nut-Locks, of which the following is a specification.

This invention relates to a nut locking device, which is in the nature of a washer having laterally bent barbs, which, when the nut is drawn up tight on the bolt, will straighten out the barbs and cause them to bite into the threads of the bolt.

The invention has for one of its objects to improve and simplify the construction and operation of devices of this character so as to be comparatively easy and inexpensive to manufacture, readily applied and having great holding power.

A further object of the invention is the provision of a nut locking device in the form of a washer having inwardly extending barbs disposed in tangential relation to the surface to be gripped and provided with roughened surfaces opposite from that engaged by the nut so as to frictionally grip the object on which the bolt is used, portions of the washer being bent down over the sides of the nut so as to prevent loosening thereof.

With these objects in view and others, as will appear as the description proceeds, the invention comprises the various novel features of construction and arrangement of parts, which will be more fully described hereinafter and set forth with particularity in the appended claims.

Figure 1:
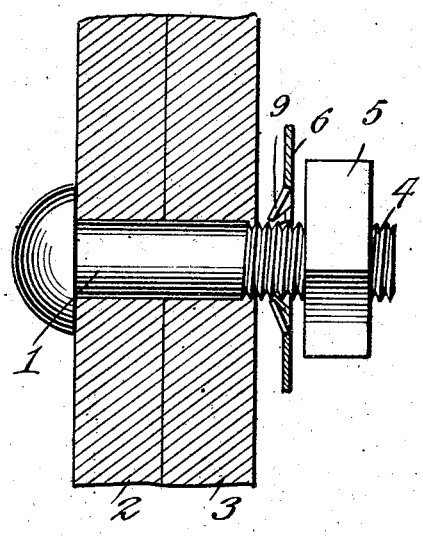
Figure 2:
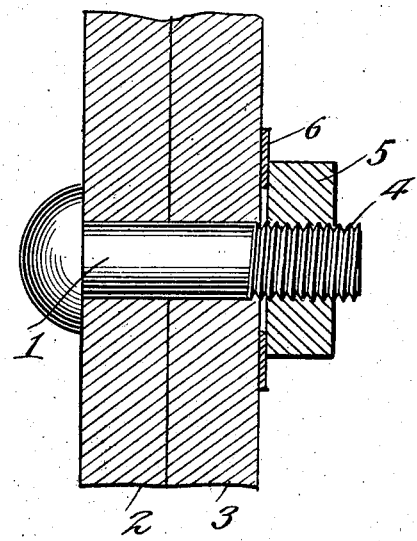
Figure 3:
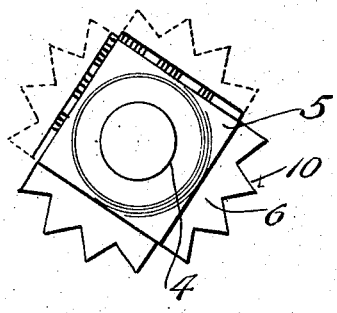
Figure 4:
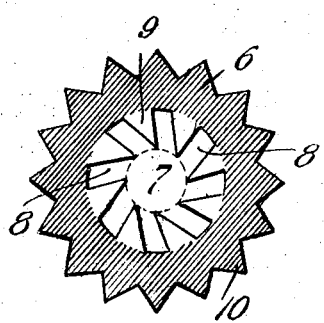

In the accompanying drawings, which illustrate one of the embodiments of the invention:—Figure 1 is a side elevation of a bolt for clamping two members together, the nut locking device being shown in section, a nut secured only partially on the bolt. Fig. 2 is a similar view showing the nut secured tightly on the bolt. Fig. 3 is an end view showing the nut locking device bent over two of the sides of the nut. Fig. 4 is a rear view of the nut locking device.

Similar reference characters are employed to designate corresponding parts throughout the several views.

Referring to the drawing, 1 designates a bolt of any approved construction for securing parts together such as members 2 and 3 and on the threads 4 is a nut 5 of any ordinary form. The nut locking device comprises a washer-like disk 6 of metal having a central opening 7 from which extend approximately tangentially disposed slots 8, as shown in Fig. 4, for forming tangential barbs 9. These barbs are pressed rearwardly so as to permit the nut locking device to freely pass over the threads of the bolt. The side of the washer-like member 6 and surface is roughened as indicated by the lines in Fig. 4 so that when the nut 4 is drawn home the roughened surface will grip the member 3 and prevent the nut locking device from turning. The periphery of the nut locking device 6 is serrated as indicated at 10 and these teeth or serrations permit of the nut locking device to be drawn back over the sides of the nuts, as indicated at Fig. 3, the serrated periphery being preferable since the nut locking device can be used in connection with square, hexagonal or any other form of nut, since the nut locking device can be bent to conform to any nut.

In practice, the bolt is passed through the members intended to be fastened together and the nut locking device 6 threaded on the bolt with the barbs 9 presented to the members to be clamped, as shown in Fig. 1. The nut 5 is secured on the bolt and as it is drawn tightly in place, the barbs 9 are straightened, as shown in Fig. 2 and caused to grip the threads of the bolt and also the roughened surface of the nut locking device, is caused to tightly engage the outer surface of the member 3. After the nut is secured tight, the nut locking device is bent outwardly at its periphery, as indicated in Fig. 3, so as to bear against any one or all of the sides of the nut and prevent the latter from turning. The bends of the washer are produced on chordal lines and the teeth of the bent-out portion or portions are pressed against the nut and the apexes of the teeth are disposed inwardly with respect to the outer face of the nut. This effect is accomplished in part by reason of the frictional engagement of the nut locking device with the member 3, and also by means of the prongs 7 being buried into the threads of the bolt. Since the barbs are arranged in tangential relation they more effectively resist any tendency to unscrew the nut and by an unscrewing movement of the nut the bars would tend to bite deeper into the bolt.

From the foregoing description, taken in connection with the accompanying drawing, the advantages of the construction and method of operation will be readily apparent to those skilled in the art to which the invention appertains and while I have described the principle of operation of the invention together with the device, which I now consider to be the best embodiment thereof, I desire to have it understood that the device shown is merely illustrative and that such changes may be made when desired, as are within the scope of the claims appended hereto.

Having thus described my invention, what I claim, is:—

The combination of a plurality of members, a bolt passing through the same, a nut on the bolt, and a nut locking device, said device comprising a washer-like body of bendable metal and provided with internal and external teeth, said teeth having their inner ends disposed in concentric circles, and the inner teeth being arranged approximately in tangential relation to the bolt, and of such length as to bite into the latter, the said body being bent outwardly against one or more sides of the nut, the bends of the body being disposed in chordal lines and the teeth of the bent-out portion or portions being disposed against the nut and having their apexes lying below the outer face of the latter.

In testimony whereof, I affix my signature in presence of two witnesses.

ELIJAH R. PARKHURST.

Witnesses:
JOHN W. MARSHALL,
LOUIS J. HEROWITZ.